US012561134B2

(12) United States Patent
Agarwal et al.

(10) Patent No.: US 12,561,134 B2
(45) Date of Patent: Feb. 24, 2026

(54) FUNCTION CODE EXTRACTION

(71) Applicant: International Business Machines Corporation, Armonk, NY (US)

(72) Inventors: Shivali Agarwal, Ghaziabad (IN); Rahamim Katan, Modiin (IL); Hiroaki Nakamura, Yokohama (JP); Ashwin Dhinesh Kumar, Ossining, NY (US); Andrew Mak, Richmond Hill (CA); Ching-Hao Lee, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 18/315,641

(22) Filed: May 11, 2023

(65) Prior Publication Data

US 2024/0378053 A1     Nov. 14, 2024

(51) Int. Cl.
    *G06F 8/74*        (2018.01)
    *G06F 8/73*        (2018.01)
    *G06F 8/75*        (2018.01)
(52) U.S. Cl.
    CPC ................. *G06F 8/74* (2013.01); *G06F 8/73* (2013.01); *G06F 8/75* (2013.01)
(58) Field of Classification Search
    CPC ................. G06F 8/73; G06F 8/74; G06F 8/75
    See application file for complete search history.

(56) References Cited

U.S. PATENT DOCUMENTS

| | | | | |
|---|---|---|---|---|
| 9,519,464 | B2 * | 12/2016 | Dang | G06F 8/33 |
| 9,703,555 | B2 * | 7/2017 | Mahamuni | G06F 8/75 |
| 10,162,610 | B2 | 12/2018 | Apte et al. | |
| 10,489,151 | B1 | 11/2019 | Katan et al. | |
| 10,579,370 | B2 | 3/2020 | Gupta | |
| 10,606,573 | B2 | 3/2020 | Apte et al. | |
| 10,866,792 | B1 * | 12/2020 | Tomlin | G06F 8/60 |
| 11,467,826 | B1 | 10/2022 | Chawda et al. | |
| 2009/0144698 | A1 * | 6/2009 | Fanning | G06F 11/3676 |
| | | | | 717/120 |

(Continued)

OTHER PUBLICATIONS

"Business Rules Extraction for Application Modernization", EvolveWare, Concurrently modernize and update applications with Agile Business Rules Extraction, accessed Feb. 17, 2023, 1 pages. https://evolveware.com/business-rules-extraction.

(Continued)

*Primary Examiner* — Wei Y Mui
*Assistant Examiner* — Amir Soltanzadeh
(74) *Attorney, Agent, or Firm* — Yee & Associates, P.C.

(57) ABSTRACT

A computer implemented method extracts code for a service. Key statements are identified for the service in a source code for a region of interest in an application in response to a program selection selecting a program in the region of interest. Importance scores are determined for the key statements based on an amount of the source code executed by each of the key statements in the source code in the region of interest. An output is generated that comprises the key statements associated with the importance scores and portions of the source code executed in response to execution of the key statements. A number of code blocks derived from a number of the portions of the source code run for a key statement is added to a workbook in response to receiving a key statement selection of the key statement in the output.

20 Claims, 13 Drawing Sheets

(56)        References Cited

U.S. PATENT DOCUMENTS

| | | | |
|---|---|---|---|
| 2015/0268955 | A1 | 9/2015 | Mehalingam et al. |
| 2017/0192777 | A1 | 7/2017 | Apte et al. |
| 2019/0392329 | A1* | 12/2019 | Rangarajan ............... G06F 8/76 |
| 2020/0142674 | A1* | 5/2020 | Hernan ................... G06F 9/541 |

OTHER PUBLICATIONS

Alomari et al., "srcSlice: very efficient and scalable forward static slicing," Journal of Software: Evolution and Process, vol. 26, Issue 11, Nov. 2014, 31 pages. https://www.cs.kent.edu/~jmaletic/papers/srcSlice2014.pdf.

Horwitz et al., "Interprocedural Slicing Using Dependence Graphs," ACM SIGPLAN Notices, vol. 23, Issue 7, Jun. 1, 1988, 12 pages. https://doi.org/10.1145/960116.53994.

Kamimura et al., "Extracting Candidates of Microservices from Monolithic Application Code," 2018 25th Asia-Pacific Software Engineering Conference (APSEC), Dec. 4-7, 2018, 10 pages. https://ieeexplore.ieee.org/document/8719439.

Komondoor et al., "Identifying services from legacy batch applications," Proceeding of the 5th Annual India Software Engineering Conference, ISEC 2012, Kanpur, India, Feb. 22-25, 2012. 10 pages. https://www.csa.iisc.ac.in/~raghavan/isec12-services.pdf.

Putrycz et al., "Recovering Business Rules from Legacy Source Code for System Modernization," Proceedings of The International RuleML Symposium onRule Interchange and Applications (RuleML-2007), Orlando, Florida, Oct. 25-26, 2007, 16 pages. https://www.researchgate.net/publication/221343094.

Sneed, "Extracting business logic from existing COBOL programs as a basis for redevelopment," Proceedings 9th International Workshop on Program Comprehension. IWPC 2001, Toronto, ON, Canada, May 12-13, 2001, 16 pages. https://ieeexplore.ieee.org/document/921728.

* cited by examiner

COMPUTING ENVIRONMENT
100

FIG. 1

COMPUTER          101

PROCESSOR SET          110

120 — PROCESSING CIRCUITRY          CACHE          121

111 — COMMUNICATION FABRIC

112 — VOLATILE MEMORY

PERSISTENT STORAGE          113

122 — OPERATING SYSTEM          CODE MANAGER          190

PERIPHERAL DEVICE SET          114

123 — UI DEVICE SET          124 — STORAGE          IoT SENSOR SET          125

NETWORK MODULE          115

103

END USER DEVICE

PRIVATE CLOUD

106

WAN          102

REMOTE SERVER

REMOTE DATABASE

130

104

GATEWAY          140

PUBLIC CLOUD          105

141 — CLOUD ORCHESTRATION MODULE          HOST PHYSICAL MACHINE SET          142

143 — VIRTUAL MACHINE SET          CONTAINER SET          144

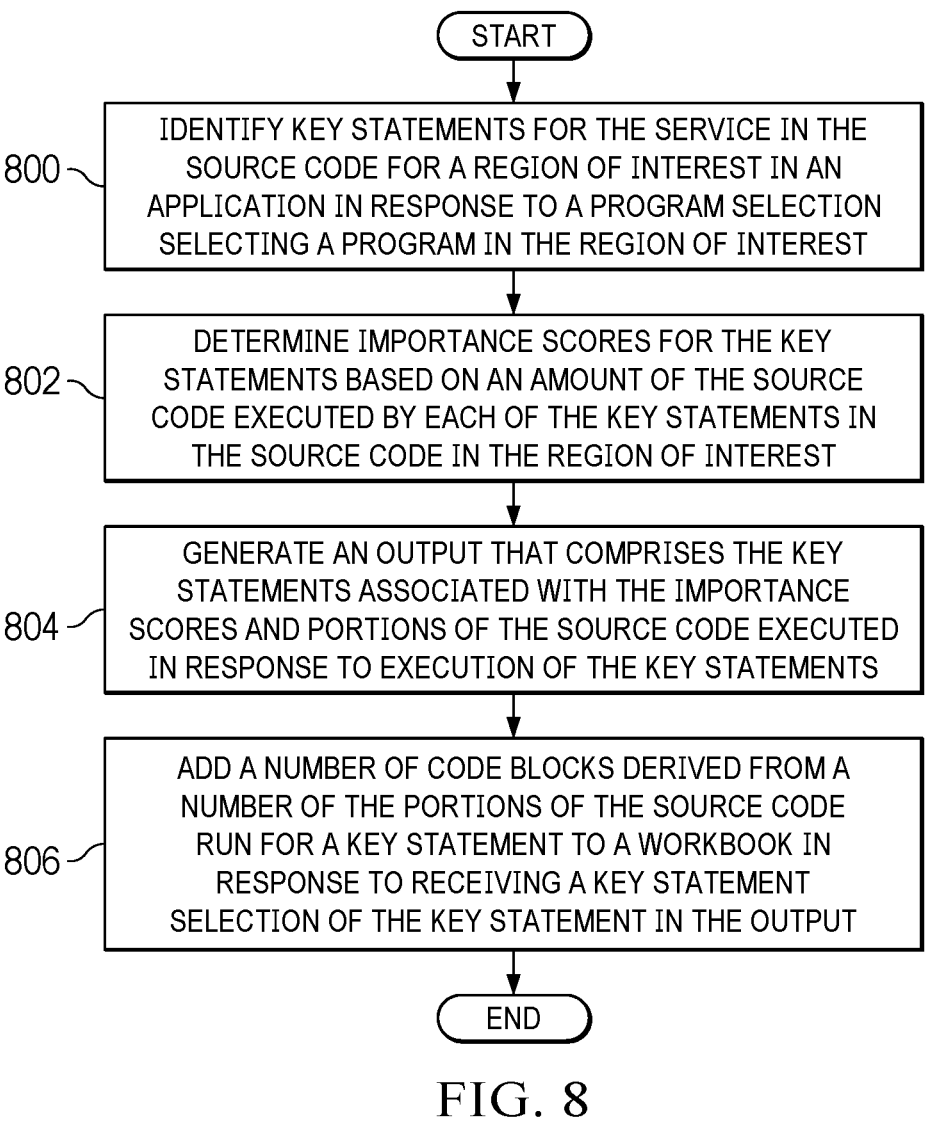

800 — IDENTIFY KEY STATEMENTS FOR THE SERVICE IN THE SOURCE CODE FOR A REGION OF INTEREST IN AN APPLICATION IN RESPONSE TO A PROGRAM SELECTION SELECTING A PROGRAM IN THE REGION OF INTEREST

802 — DETERMINE IMPORTANCE SCORES FOR THE KEY STATEMENTS BASED ON AN AMOUNT OF THE SOURCE CODE EXECUTED BY EACH OF THE KEY STATEMENTS IN THE SOURCE CODE IN THE REGION OF INTEREST

804 — GENERATE AN OUTPUT THAT COMPRISES THE KEY STATEMENTS ASSOCIATED WITH THE IMPORTANCE SCORES AND PORTIONS OF THE SOURCE CODE EXECUTED IN RESPONSE TO EXECUTION OF THE KEY STATEMENTS

806 — ADD A NUMBER OF CODE BLOCKS DERIVED FROM A NUMBER OF THE PORTIONS OF THE SOURCE CODE RUN FOR A KEY STATEMENT TO A WORKBOOK IN RESPONSE TO RECEIVING A KEY STATEMENT SELECTION OF THE KEY STATEMENT IN THE OUTPUT

FIG. 8

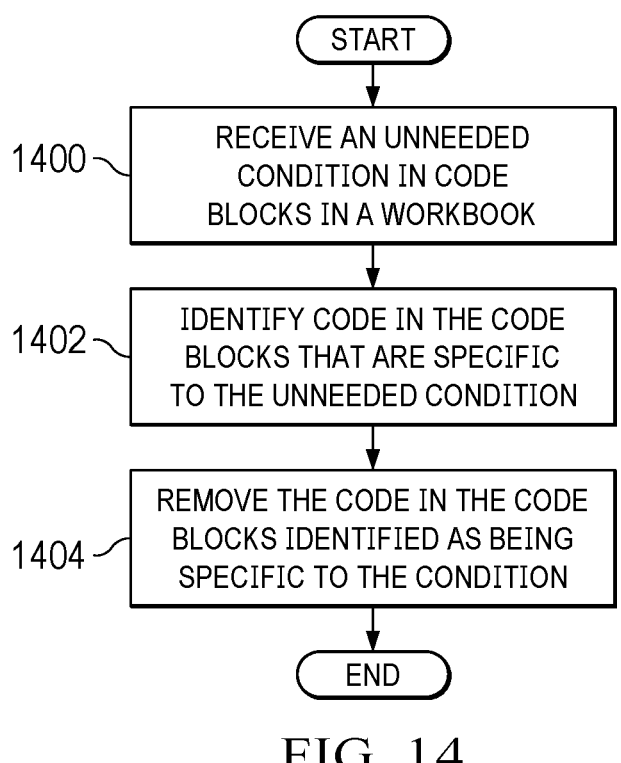

START

1400 — RECEIVE AN UNNEEDED CONDITION IN CODE BLOCKS IN A WORKBOOK

1402 — IDENTIFY CODE IN THE CODE BLOCKS THAT ARE SPECIFIC TO THE UNNEEDED CONDITION

1404 — REMOVE THE CODE IN THE CODE BLOCKS IDENTIFIED AS BEING SPECIFIC TO THE CONDITION

END

FIG. 14

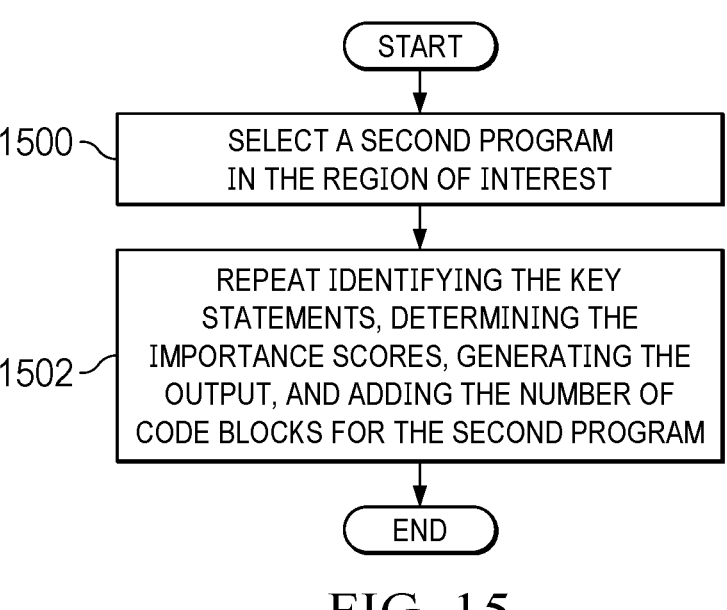

START

1500 — SELECT A SECOND PROGRAM IN THE REGION OF INTEREST

1502 — REPEAT IDENTIFYING THE KEY STATEMENTS, DETERMINING THE IMPORTANCE SCORES, GENERATING THE OUTPUT, AND ADDING THE NUMBER OF CODE BLOCKS FOR THE SECOND PROGRAM

END

FIG. 15

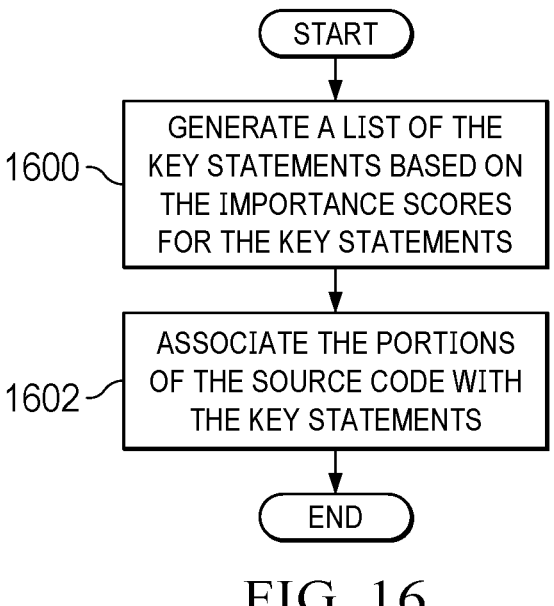

START

1600 ─ GENERATE A LIST OF THE KEY STATEMENTS BASED ON THE IMPORTANCE SCORES FOR THE KEY STATEMENTS

1602 ─ ASSOCIATE THE PORTIONS OF THE SOURCE CODE WITH THE KEY STATEMENTS

END

FIG. 16

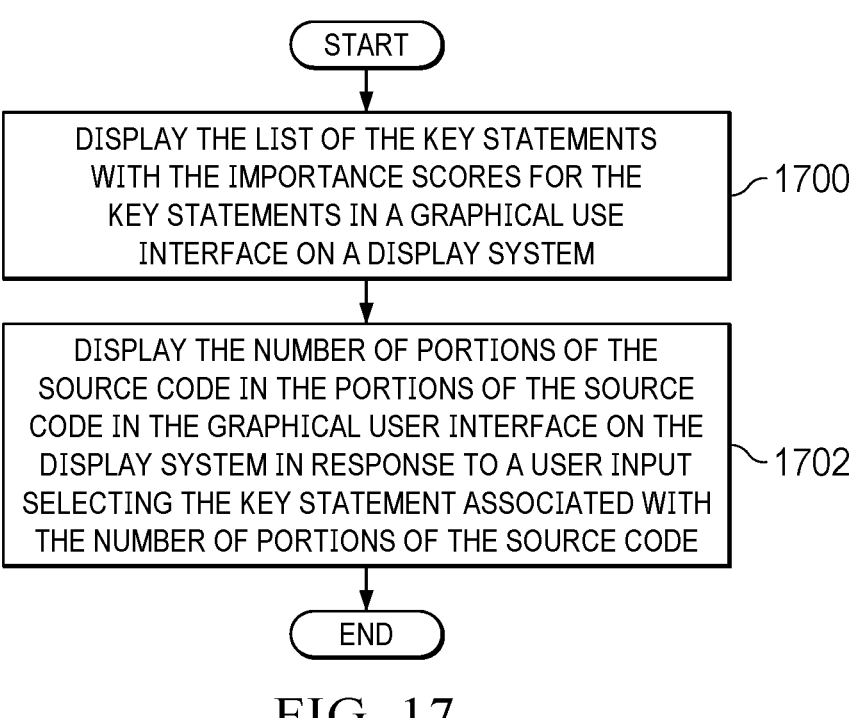

START

DISPLAY THE LIST OF THE KEY STATEMENTS WITH THE IMPORTANCE SCORES FOR THE KEY STATEMENTS IN A GRAPHICAL USE INTERFACE ON A DISPLAY SYSTEM ─ 1700

DISPLAY THE NUMBER OF PORTIONS OF THE SOURCE CODE IN THE PORTIONS OF THE SOURCE CODE IN THE GRAPHICAL USER INTERFACE ON THE DISPLAY SYSTEM IN RESPONSE TO A USER INPUT SELECTING THE KEY STATEMENT ASSOCIATED WITH THE NUMBER OF PORTIONS OF THE SOURCE CODE ─ 1702

END

FIG. 17

FUNCTION CODE EXTRACTION

BACKGROUND

The disclosure relates generally to an improved computer system and more specifically to extracting code for creating a service.

Many legacy applications can take the form of multiple programs. These applications can contain multiple services for the processes and activities of an organization.

An application can have services that provide functionality or an ability to perform activities for an organization. These activities can include marketing, finance, human resources, research, operations management, and other organizational functions. For example, programs may include services to manage supply chains, logistics, quality, research processes, banking transactions, and other types of functions. A service provides a software functionality or a set of software functionalities. For example, the software functionality can include the retrieval of information or the execution of a set of operations.

In legacy applications the code for a service is not in a standalone or modular form. By extracting the code for a service, this code can be used to create a new service that is a standalone or modular components. With this form of the service, increased modularity, reduced maintenance, and other benefits are present.

A legacy application can have code for services that extends through the different programs that form the application. This code is typically located within programs that have code for many other services, functions, or purposes as well. It is desirable to extract the code for a particular service from the application such that that code can be used to create new service in a different form for newer applications. Slicing can be performed to identify and extract portions of code that are relevant to a particular function in application. This process can have increased complexity when service extends through several programs within the application. Slicing involves identifying the code within each program that contributes to the behavior of the function. By identifying these portions of code, the code can be used to create a new program or service that provides the ability to form the task or tasks of the service in the legacy application.

SUMMARY

According to one illustrative embodiment, a computer implemented method extracts code for a service. A number of processor units identify key statements for the service in a source code for a region of interest in an application in response to a program selection selecting a program in the region of interest. The number of processor units determines importance scores for the key statements based on an amount of the source code executed by each of the key statements in the source code in the region of interest. The number of processor units generates an output that comprises the key statements associated with the importance scores and portions of the source code executed in response to execution of the key statements. The number of processor units adds a number of code blocks derived from a number of the portions of the source code run for a key statement to a workbook in response to receiving a key statement selection of the key statement in the output. According to other illustrative embodiments, a computer system and a computer program product for extracting code for a service are provided.

BRIEF DESCRIPTION OF THE DRAWINGS

FIG. 1 is a block diagram of a computing environment in accordance with an illustrative embodiment;

FIG. 8 is a flowchart of a process for extracting source code for a service in accordance with an illustrative embodiment;

FIG. 14 is a flowchart of process for removing program codes from code blocks in a workbook in accordance with an illustrative embodiment;

FIG. 15 is a flowchart of process for selecting program code extraction in accordance with an illustrative embodiment;

FIG. 16 is a flowchart of a process for generating an output in accordance with an illustrative embodiment;

FIG. 17 is a flowchart of a process for displaying a graphical user interface to receive user input in extracting source code from the application in accordance with an illustrative embodiment.

DETAILED DESCRIPTION

Figure 2:
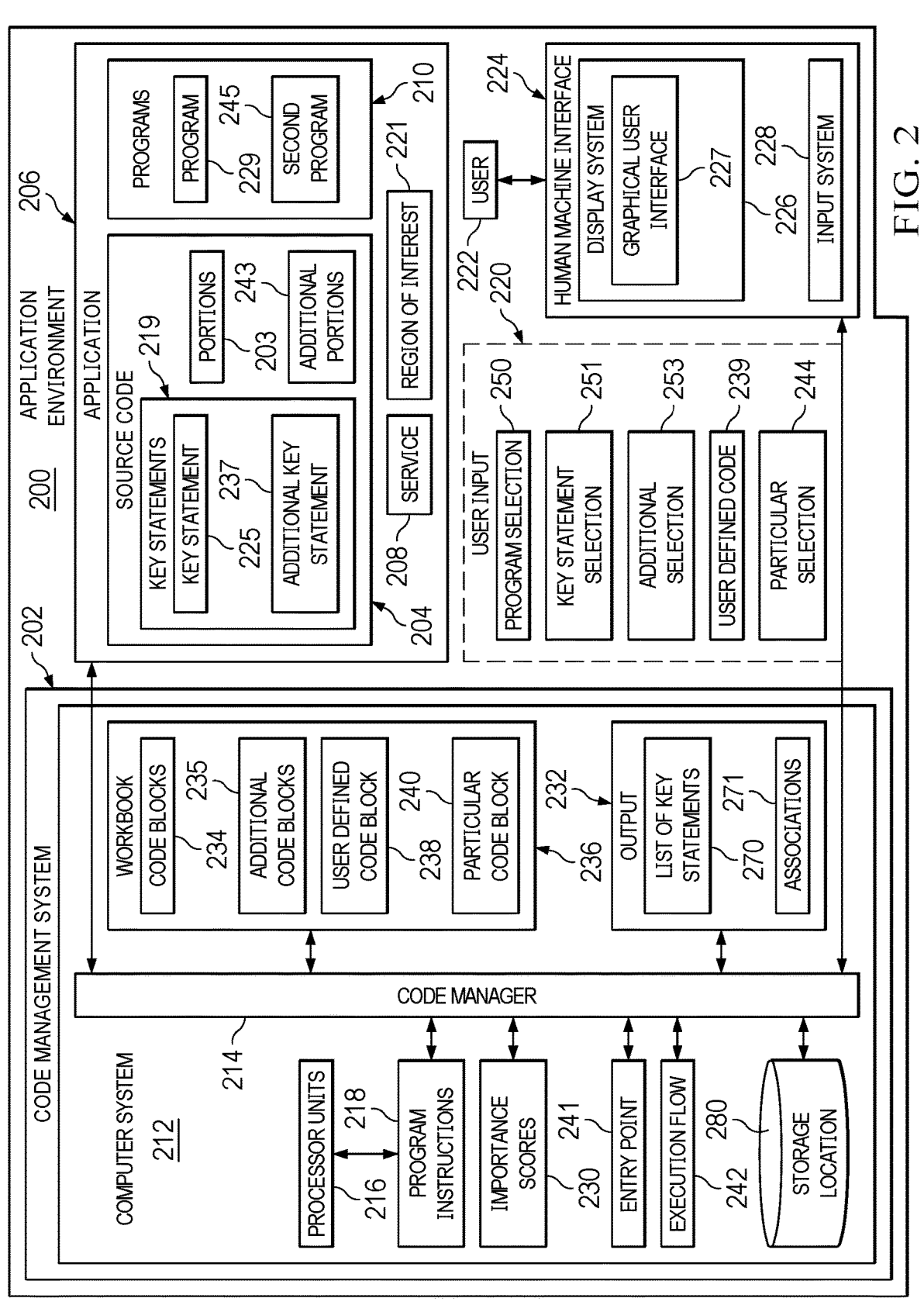
FIG. 2 is a block diagram of a code environment in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as code manager 190. In addition to code manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface-type operating systems that employ a kernel. The code included in code manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, current techniques for slicing or extracting source code for services in an application to create new services can be more difficult than desired. Current techniques for slicing or extracting source code for a service can return many branches of the source code for different services. As result, this type of approach can result in returning code for different services other than the service that has been selected for extraction from the source code. As result, increased time and effort is used to identify the code for the service that has been selected for extraction from an application.

Further, current slicing techniques operate by extracting source code based on an input variable or seed term search. These techniques are designed for business logic extraction based on an input variable or seed term search. No slicing capabilities are present with this type of technique to isolate code corresponding to rules for a desired service. Further, this type of technique does not isolate the process or flow for a service at a statement level. Some current techniques operate at a method and class level groupings defined code performing a similar function. These systems rely on call chain and naming conventions. These types of systems do not identify code encompassing logic or execution flow for a service at a statement level.

The illustrative examples provide a computer implemented method, apparatus, system, and computer program product for extracting code for a service. A number of processor units identify key statements for the service in a source code for a region of interest in an application in response to a program selection selecting a program in the region of interest. The number of processor units determines importance scores for the key statements based on an amount of the source code executed by each of the key statements in the source code in the region of interest. The number of processor units generates an output that comprises the key statements associated with the importance scores and portions of the source code executed in response to execution of the key statements. The number of processor units adds a number of code blocks derived from a number of the portions of the source code run for a key statement to a workbook in response to receiving a key statement selection of the key statement in the output.

The illustrative examples enable isolating code respect to a service that may be intertwined with code from other services in different programs in an application. The illustrative examples recognize and take into account that a fully automated process can result in extracting code that may not be part of the service. The different illustrative examples can receive selections in user input from a user that increases the accuracy or likelihood that the source code is extracted for the service that has been selected for extraction. In illustrative examples, a service is code that can perform a task or set of tasks.

With reference now to FIG. 2, a block diagram of a code environment is depicted in accordance with an illustrative embodiment. In this illustrative example, application environment 200 includes components that can be implemented in hardware such as the hardware shown in computing environment 100 in FIG. 1.

In this illustrative example, code management system 202 can be used to manage code for applications. For example, code management system 202 can extract source code 204 from application 206 for service 208. The source code extracted is service 208 in application 206 in this example. This source code can be used to create a modular form of service 208 that can be more easily accessed by other code. Further, this modular form can allow for easier maintenance and updates and increased scalability for use to create service 208. This source code can be located in a number of programs 210 in application 206.

In this illustrative example, code management system 202 is comprised of a number of different components. As depicted, code management system 202 includes computer system 212 and code manager 214. Code manager 214 is located in computer system 212.

Code manager 214 can be implemented in software, hardware, firmware or a combination thereof. When software is used, the operations performed by code manager 214 can be implemented in program instructions configured to run on hardware, such as a processor unit. When firmware is used, the operations performed by code manager 214 can be implemented in program instructions and data and stored in persistent memory to run on a processor unit. When hardware is employed, the hardware can include circuits that operate to perform the operations in code manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program instructions that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, the process for extracting source code 204 for service 208 in source code 204 can be performed with user input 220 from user 222. In this example, user input 220 can be generated by user 222 using human machine interface (HMI) 224.

As depicted, human machine interface 224 comprises display system 226 and input system 228. Display system 226 is a physical hardware system and includes one or more display devices on which graphical user interface 227 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 222 is a person that can interact with graphical user interface 227 through user input 220 generated by input system 228. Input system 228 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In one illustrative example, code manager 214 can operate to extract source code 204 from application 206 for service 208. For example, code manager 214 identifies key statements 219 for service 208 in source code 204 for region of interest 221 in application 206 in response to program selection 250 selecting program 229 in programs 210 in region of interest 221. In this illustrative example, key statements 219 are statements within source code 204 in application 206. Key statements 219 are statements within source code 204 that control the flow of execution within application 206.

For example, key statements 219 can be selected from at least one of a conditional statement, a paragraph name, a method name, a data access statement, or other types of statements. A paragraph statement is a statement with a paragraph name that marks the beginning of a grouping of statements in source code 204 that can perform a specific task or set of related tasks. In this example, the execution of statements in source code 204 can be selected from at least one of symbolic execution or runtime execution.

Region of interest 221 is a portion of source code 204 in application 206. Region of interest 221 can include source code 204 is to be extracted for service 208. In this example, code manager 214 can determine region of interest 221 using entry point 241 and execution flow 242 for source code 204. Further, in this example, execution flow 242 occurs from source code 204 executed from entry point 241.

Region of interest 221 can include a number of programs 210 that contain source code 204 for service 208. In this example, entry point 241 is a statement in source code 204. Entry point 241 can be selected for a transaction, an action, or other feature for service 208.

In this illustrative example, code manager 214 determines importance scores 230 for key statements based on an amount of source code 204 executed by each of key statements 219 in source code 204 in region of interest 221. Code manager 214 generates output 232 that comprises key statements 219 associated with importance scores 230 and portions 203 of source code 204 executed in response to execution of key statements 219.

In generating output 232, code manager 214 can generate list of key statements 270 based on importance scores 230 for key statements 219. List of key statements 270 can be all or a portion of key statements 219. In this example, list of key statements 270 can be ranked based on importance scores 230. In other illustrative examples, a top number of key statements 219 can be included in the list of key statements 270 rather than all of key statements 219. For example, the top 10 or 20 key statements can be used in list of key statements 270.

Code manager 214 associates portions 203 of source code 204 with key statements 219 in list of key statements 270. In this example, code manager 214 creates associations 271 in output 232. Associations 271 can be pointers to portions 203. In one illustrative example, portions 203 of source code 204 can be included in output 232. In other examples, these portions can be in another location such as a file, a database, or some other suitable location that can be accessed using associations 271.

With output 232, code manager 214 can display information to user 222 over human machine interface 224. For example, code manager 214 can display list of key statements 270 with the importance scores 230 for key statements 219 in graphical user interface 227 on display system 226. In another illustrative example, this list can be displayed without importance scores 230. With this example, key statements 219 in list of key statements 270 can be displayed in a rank order from highest to lowest.

Additionally, code manager 214 can display the number of portions 203 of source code 204 in portions 203 of source code 204 in graphical user interface 227 on display system 226 in response to user input 220 selecting key statement 225 associated with the number of portions 203 of source code 204.

In this example, user 222 can select key statement 225 from list of key statements 270. In other words, initial selection of key statement 225 in list of key statements 270 can result in code manager 214 displaying the number of portions 203 of source code 204 associated with key statement 225 in graphical user interface 227.

After reviewing the number portions of source code 204, user 222 can generate user input 220 to include the number portions of source code 204 for key statement 225 as one or more code blocks in code blocks 234 in workbook 236. If user 222 is not satisfied that the number of portions 203 of source code 204 associated with key statement 225 are for service 208, user 222 can select another key statement for review in graphical user interface 227.

Thus, this display of source code 204 based on user input 220 can enable user 222 to determine whether these portions 203 of source code 204 contains statements for service 208. In other words, user 222 can provide guidance to increase the accuracy in extracting source code 204 for service 208 from application 206.

In this example, code manager 214 adds a number of code blocks 234 derived from a number of portions 203 of source code 204 run for key statement 225 to workbook 236 in response to receiving key statement selection 251 of key statement 225 in output 232. In this illustrative example, key statement 225 is a key statement in key statements 219 and can be selected in output 232 from list of key statements 270. In this illustrative example, the number of portions 203 of source code 204 can be all portions of source code 204 executed from executing key statement 225. The portion of source code 204 in which key statement 225 is located can call other portions of source code 204 in response to executing key statement 225. Each of these portions of source code 204 form the number of portions 203 that are used to create code blocks 234 in workbook 236.

Workbook 236 is a data structure that contains a collection of related code and resources that can be used to execute the code. In one example, the data structure is a file. For example, configuration files, documentation, and other information can also be included in workbook 236 in addition to the number of portions of source code 204. In this example, code blocks 234 are created from portions of source code 204 in response to selections of one or more key statements and output 232. Workbook 236 can be a file, a database, or other data structure.

In this illustrative example, output 232 can be displayed in graphical user interface 227 on display system 226 in human machine interface 224. With this display of output 232, user 222 can generate user input 220 to make various types of selections. As depicted, the selections can include program selection 250, key statement selection 251, as well as other user input.

For example, code manager 214 can add a number of additional code blocks 235 to the workbook 236 in response to receiving additional selection 253 of additional key statement 237. In this example, additional key statement 237 can be selected from key statements 219 in list of key statements 270 in output 232. In this example, the number of additional code blocks 235 added to workbook 236 is derived from a number of additional portions 243 of the source code 204 run for additional key statement 237 in output 232.

In another example, code manager 214 can place user defined code block 238 into workbook 236 in response to receiving user defined code 239. In this example, user defined code 239 can be received from user 222 in user input 220.

Further, code manager 214 can modify workbook 236. This modification can include removing particular code block 240 from workbook 236 in response to receiving particular selection 244 of particular code block 240 for removal.

As another example, code manager 214 can select second program 245 in programs 210 in response to user input 220 selecting second program 245 for code extraction. With this selection, code manager 214 can repeat identifying key statements 219, determining importance scores 230, generating output 232, and adding a number of code blocks 234 to workbook 236 for source code 204 in second program 245. In this manner, source code 204 for service 208 can be extracted from programs 210.

In this illustrative example, code manager 214 exports workbook 236 to a storage location 280 in response to user input 220 affirming workbook 236 for export. Storage location 280 can be any data store, database, or other type of storage.

Workbook 236 can be used to generate a microservice or other services that can be in a modular form that encompasses the processes and functions within service 208 that has been extracted from application 206. In this manner, service 208 and application 206 containing programs 210 can be extracted to create can be used to create a modular or stand-alone form of service 208. As result, service 208 can be implemented in a form that is more easily accessed by other code in other services or modules. Further, this form of service 208 can enable easier maintenance and updates as well as increased scalability.

In one illustrative example, one or more solutions are present that overcome issues with extracting source code from an application. The use of code manager 214 can increase the accuracy in extracting source code for a service from a legacy application in which the service can extend through multiple programs in the application. The speed and accuracy in extracting source code for a service can be increased through selective request for user input during the extraction process.

Computer system 212 can be configured to perform at least one of the steps, operations, or actions described in the different illustrative examples using software, hardware, firmware or a combination thereof. As a result, computer system 212 operates as a special purpose computer system in which code manager 214 in computer system 212 enables extracting source code for a service. In particular, code manager 214 transforms computer system 212 into a special purpose computer system as compared to currently available general computer systems that do not have code manager 214.

In the illustrative example, the use of code manager 214 in computer system 212 integrates processes into a practical application for extracting source code for a service that increases the performance of computer system 212. In other words, code manager 214 in computer system 212 is directed to a practical application of processes integrated into code manager 214 in computer system 212 identifies key statements, determines importance scores for the key statements, and generates output based on the key statements and importance scores. The output can be used to prompt or elicit user input to select different key statements to generate code blocks from the portions of source code for those key statements. As a result, code manager 214 in computer system 212 increases the accuracy in extracting source code for a service from a legacy application. With the use of a graphical user interface to display key statements and portions of source code associated with those key statements, a graphical tool is provided to a user to increase the accuracy in extracting the source code for a service.

The illustration of application environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
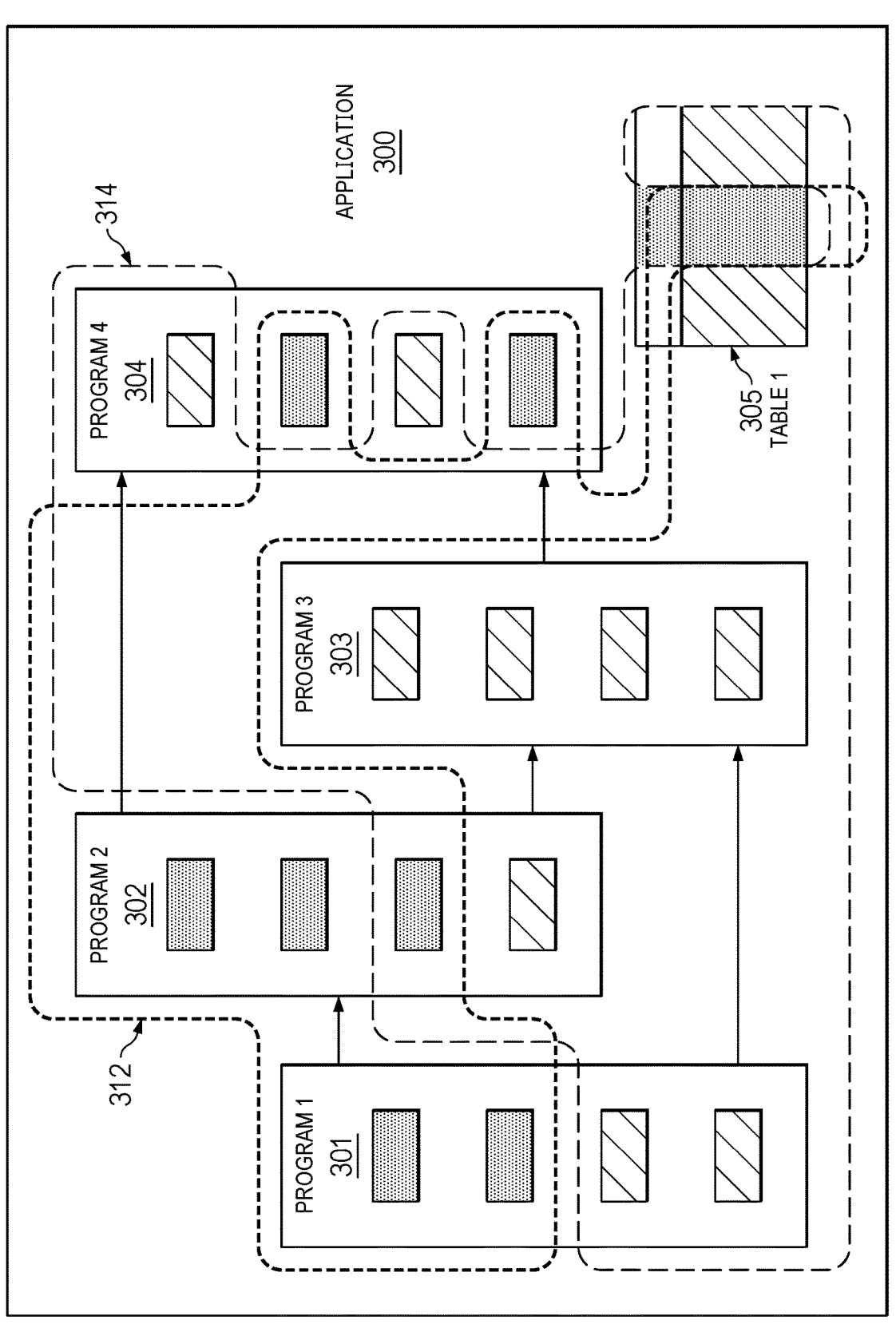
FIG. 3 is an illustration of services in an application in accordance with an illustrative embodiment.

Turning next to FIG. 3, an illustration of services in an application is depicted in accordance with an illustrative embodiment. In this illustrative example, application 300 is an example of application 206 shown in block form in FIG. 2. Application 300 is an example of an application of source code that can be processed using code manager 214 in FIG. 2 to identify source code for a service.

This illustrative example, service 312 and service 314 are comprised of statements extending through program 1 301, program 2 302, program 3 303, program 4 304. In this example, the statements for the two services can access data in table 1 305.

As depicted, different variables are present in application 300 that affect the execution flow for two services through the programs in application 300. Further, different conditional branches are also present that are followed for the services depending on the value of the variables. In this example, these values can be passed from one program to another program in a technique referred to as program passing of parameters.

The different illustrative examples can identify the paths that service 312 and service 314 take through these programs. False positives can be reduced, and information can be presented to a user without overwhelming the user using code manager 214 in code management system 202 in FIG. 2. In the illustrative example, a user can select portions of program 4 304 for analysis and slicing. For example, the user can select service 312 for extraction. With this selection, the user can begin with program 1 301 and identify portions of code based on key statements presented to the user in output 232 displayed on graphical user interface 227 in FIG. 2. The user can then select program 2 302 to extract source code for service 312 in program 2 302. This process can be performed for each of the succeeding programs, program 3 303 and program 4 304 resulting in a workbook containing source code extracted for service 312.

Figure 4:
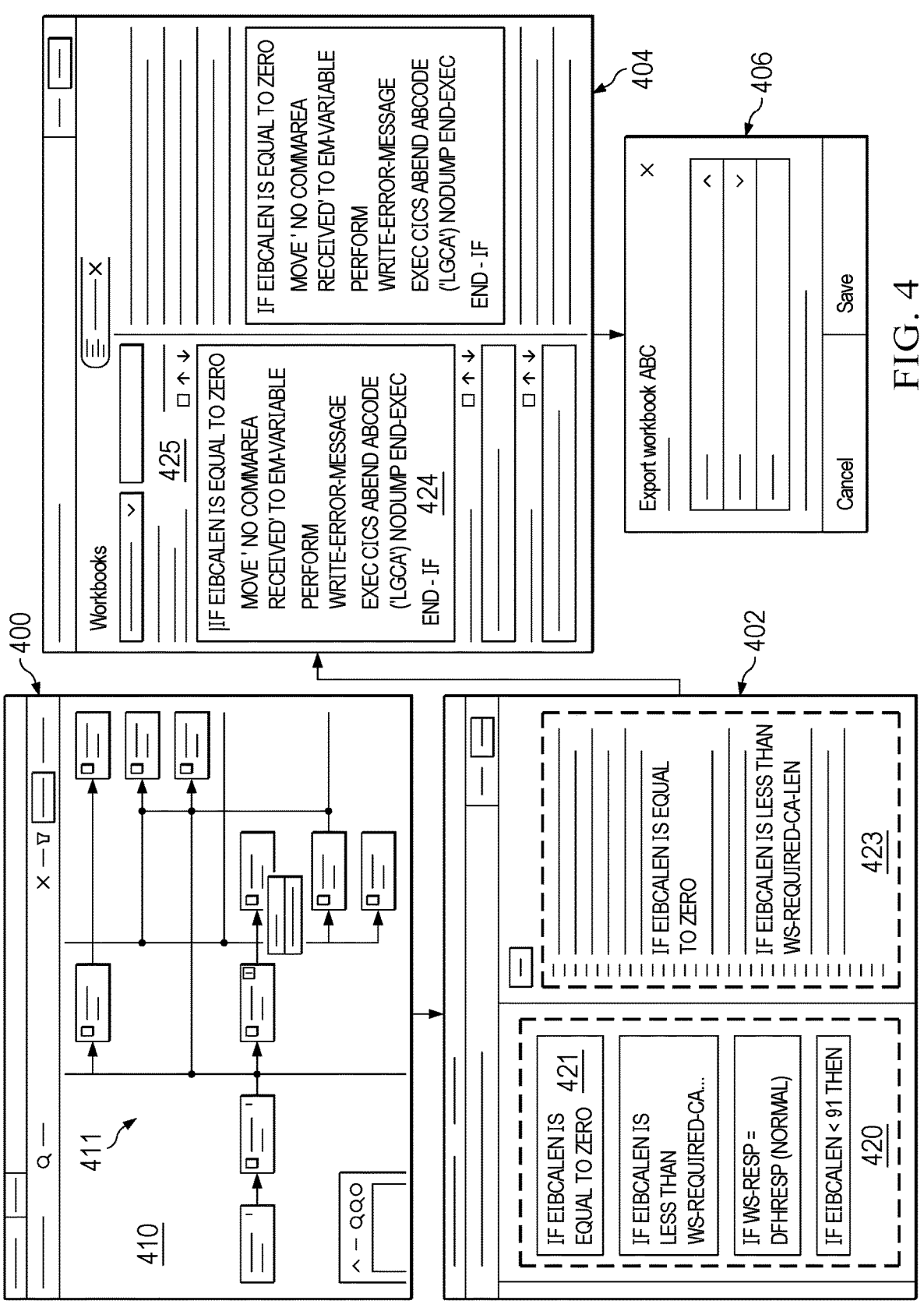
FIG. 4 is a pictorial illustration of a process for extracting source code from an application in accordance with an illustrative embodiment.

With reference next to FIG. 4, a pictorial illustration of a process for extracting source code from an application is depicted in accordance with an illustrative embodiment. In this illustrative example, window 400, window 402, window 404, and window 406 are examples of windows that can be displayed in graphical user interface 227 on display system 226 in FIG. 2. These windows can be displayed as part of a user guided process for identifying execution paths for slicing or extracting source code for a service.

In this example, the process displays region of interest 410 in window 400. As depicted, region of interest 410 identifies execution flow through programs and other structures from an entry point. This entry point can be, for example, a transaction, an action, a feature, or other statement of interest in the application.

As depicted in this figure, this region of interest 410 is represented as closure graph of call dependencies 411. As depicted, closure graph of call dependencies 411 is a graphical display of the relationship between statements, functions, paragraphs, subroutines, and other groupings of statements within an application. This closure graph of call dependencies can display the dependencies in a call hierarchy that can show direct relationships and indirect relationships.

In this illustrative example, a selection of a program within region of interest 410 in window 400 can be received in a user input. The selection of the program results in identifying key statements that can be in the execution path for a service. Scores are generated for these key statements. Additionally, portions of source code executed in response to execution of these key statements are also identified. This example, key statements 420 are displayed in window 402.

As depicted, four key statements are present in key statements 420 displayed in window 402. These key statements are ranked based on scoring from the highest score to a lowest score. In some illustrative examples, additional key statements can be present but not displayed in window 402. For example, key statements 420 can be the top four key statements in the key statements identified based on the selection of the program from closure graph of call dependencies 411 in window 400.

As depicted, key statement 421 has been selected in window 402 through a user input. The selection of this key statement results in portions of source code 423 being displayed in window 402. These portions of source code are source code that are invoked in at least one of a forward execution or backward execution of key statement 421.

In this example, additional source code may be present in portions of source code 423 but not shown in window 402. These additional portions of the source code invoked or executed in response to the execution of key statement 421 can be viewed by using controls such as a scroll bar.

Further, a user input can be made to select portions of source code 423 for use in workbook 425 displayed in window 404. In this example, portions of source code 423 are used to create code block 424 in workbook 425 displayed in window 404 contain the code for the service, the user can elect or initiate export of the work for as shown in window 406. Once the user is satisfied that the code blocks in workbook 425.

Figure 5:
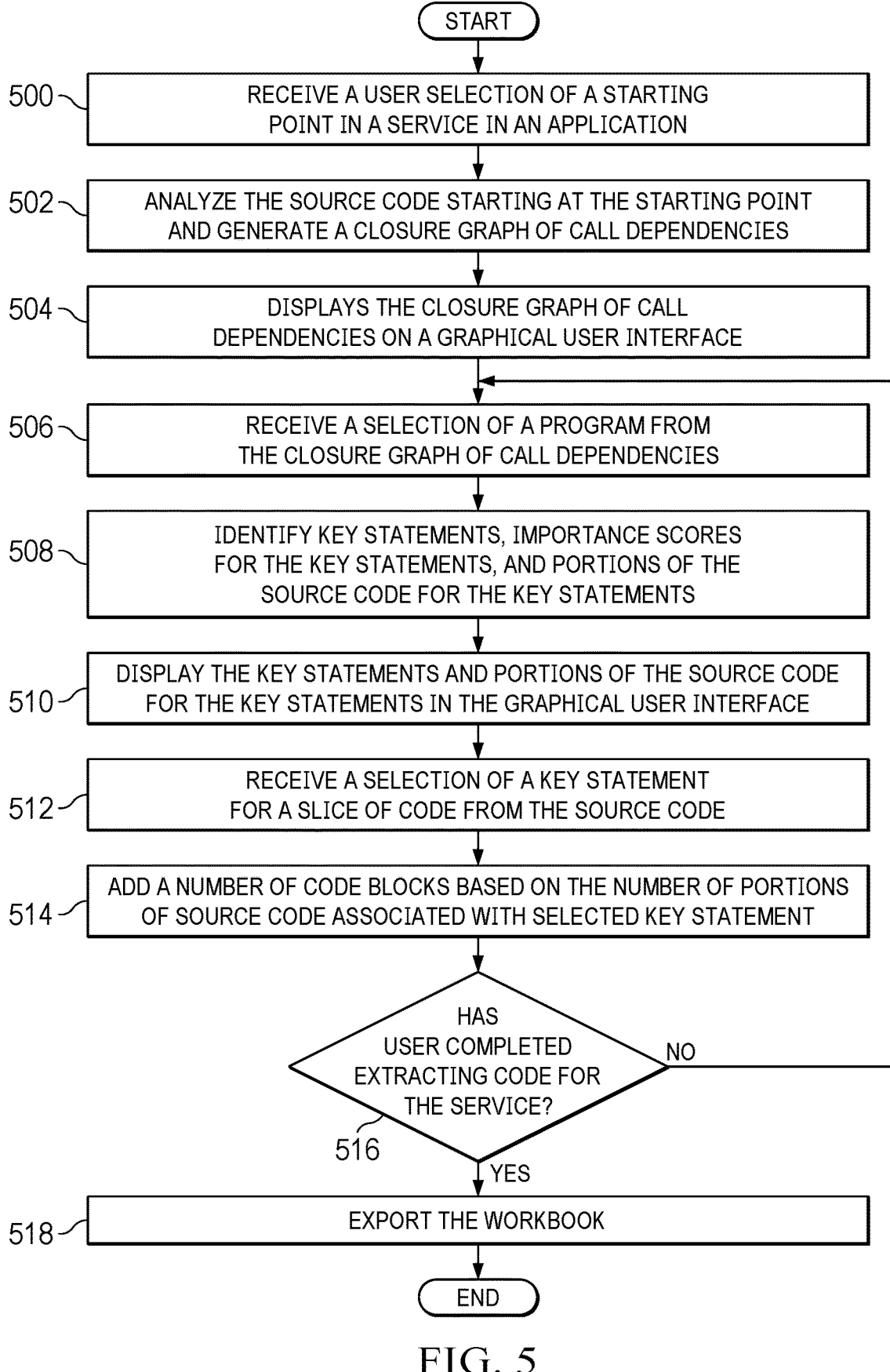
FIG. 5 is a flowchart for user guided isolation of source code in accordance with an illustrative embodiment.

Turning next to FIG. 5, a flowchart for user guided isolation of source code is depicted in accordance with an illustrative embodiment. The process illustrated in FIG. 5 is a high level representation of steps that can be used to extract source code for a service from an application. The process in FIG. 5 can be implemented in hardware, software, or both. When implemented in software, the process can take the form of program instructions that are run by one of more processor units located in one or more hardware devices in one or more computer systems. For example, the process can be implemented in code manager 214 in computer system 212 in FIG. 2.

In this illustrative example, the process begins by receiving a user selection of a starting point in a service in an application (step 500). In step 500, this user input can select a starting point for a service for which source code is to be extracted. This starting point can be a transaction, feature, or some other location in the source code for the service. This selection can also be referred to as a seed.

In response to receiving user input, the process analyzes the source code starting at the starting point and generates a closure graph of call dependencies (step 502). In step 502, this analysis can be performed by analyzing the source code to identify portions such as functions, variables, and statements. The process identifies function calls where one function calls another function. These calls are identified as relationships for the graph. The process can identify calls that extend from one program to another program in the application. This information is used to generate the closure graph of call dependencies that identifies flow between programs in the application. In this example, the process displays the closure graph of call dependencies on a graphical user interface (step 504) for visualization by a user.

With this output, the process receives a selection of a program from the closure graph of call dependencies (step 506). In step 506, this user input with the selection can be made based on the visualization of programs in the closure graph of call dependencies displayed in the graphical user interface.

The process identifies key statements, importance scores for the key statements, and portions of the source code for the key statements (step 508). These portions of source code include statements that are invoked in at least one of a forward execution or backward execution of a key statement. The process displays the key statements and portions of the source code for the key statements in the graphical user interface (step 510).

The process receives a selection of a key statement for a slice of code from the source code (step 512). In step 512, a slice of code is a section or portion of code. Also, other information can be input as part of the selection. For example, workbook name tags can be included in the selection in step 512. In response to receiving this selection from the user, the process adds a number of code blocks based on the number of portions of source code associated with selected key statement (step 514).

A determination is made as to whether the user has completed extracting code for the service (step 516). If the user has completed extracting code for the service, the process exports the workbook (step 518). The process terminates thereafter. Otherwise, the process returns to step 506 as described above.

Figure 6:
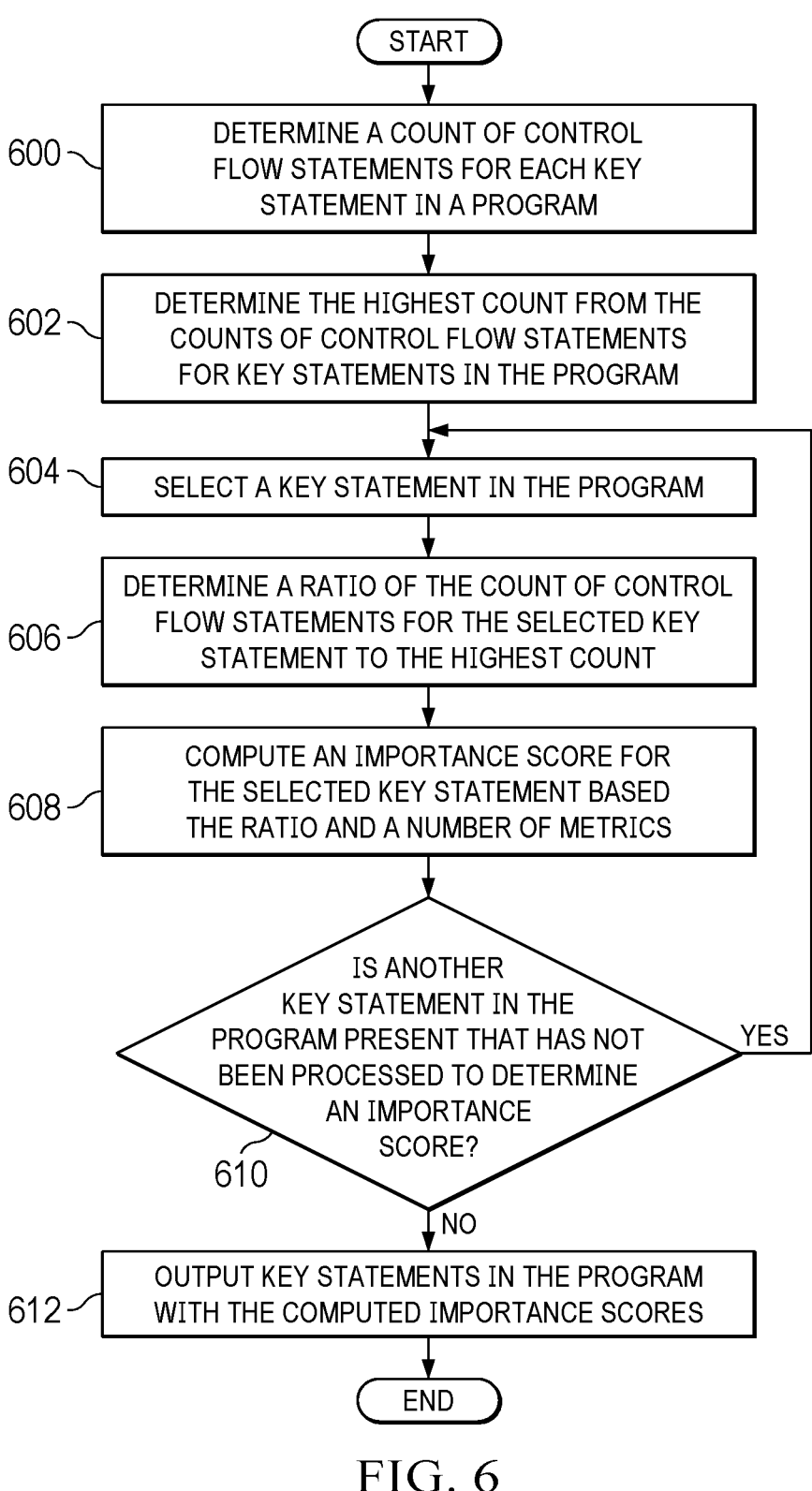
FIG. 6 is a flowchart of a process for determining importance scores for key statements in a program in accordance with an illustrative embodiment.

Turning next to FIG. 6, a flowchart of a process for determining importance scores for key statements in a program is depicted in accordance with an illustrative embodiment. The process in FIG. 6 can be implemented in hardware, software, or both. When implemented in software, the process can take the form of program instructions that are run by one or more processor units located in one or more hardware devices in one or more computer systems. For example, the process can be implemented in code manager 214 in computer system 212 in FIG. 2. In FIG. 6, a higher importance score for a key statement in a program indicates that the key statement drives more program logic in the program. The steps in this flowchart are examples of steps that can be performed by code manager 214 to determine importance scores 230 for key statement 225 in FIG. 2.

The process begins by determining a count of control flow statements for each key statement in a program (step 600). In step 600, control flow statements are statements that control the flow of execution for the program. In this example, the execution of control flow statements are not based on conditions. For example, control flow statements can be a Perform statement, a Goto statement, a Link statement, and a Call statement.

In this illustrative example, different control flow statements can have different weights for determining the counts of control flow statements for each key statement. For example, each Perform statement and each Goto statement can have a weight of 1 while all Call statements and all Link statements together can have a weight of 2.

The process determines the highest count from the counts of control flow statements for key statements in the program (step 602). In step 602, the highest count is the maximum value of all counts of control flow statements determined for key statements in the program. The process selects a key statement in the program for processing (step 604).

The process determines a ratio of the count of control flow statements for the selected key statement to the highest count (step 606). The process computes an importance score for the selected key statement based on the ratio and a number of metrics for the selected key statement (step 608). In step 608, the number of metrics can include a depth of the selected key statement in the control flow graph, size and a depth of subtree rooted at the node for the selected key statement in the control flow graph, whether the selected key statement is a part of main paragraph for the program, number of SQL statements in conditional block for the selected key statement, number of conditional statements nested within the selected key statement, and whether the selected key statement performs performing error processing or bookkeeping.

In this example, the main paragraph is the entry point of the program. In addition, error processing includes identifying and handling errors that occur during execution of the program and bookkeeping includes keeping track of data and resources used by the program.

In step 608, the importance score for the selected key statement can be generated as a weighted sum for the ratio and the number of metrics using the following equation:

$$w1*X_1 + w2*X_2 + w3*X_3 + w4*X_4 + w5*X_5 \qquad (1)$$

where X1, X2, X3, X4, and X5 are variable for the ratio and the metrics as described above, and w1, w2, w3, w4, and w5 are the corresponding weights for the ratio and metrics as described above.

In one illustrative example, the process can also take context into consideration in determining importance score for the selected key statement. The context is values for a portion of the source code in the selected key statement that is also used in other programs. The context can be values assigned to variables that influence execution paths in the source code for the selected key statement. In this example, the context can be determined during the process of determining importance scores for key statements in other programs. In this example, the context can be used to influence the weights for the metrics when determining the importance score for key statements.

The process determines whether another key statement in the program is present that has not been processed to determine an importance score (step 610). If another key statement in the program is present, the process returns to step 604 and repeats step 604 to step 610 until all key statements in the program have been processed to determine importance scores.

If all key statements in the program have been processed, the process proceeds to output key statements in the program with the computed importance scores (step 612). The process terminates thereafter.

Figure 7:
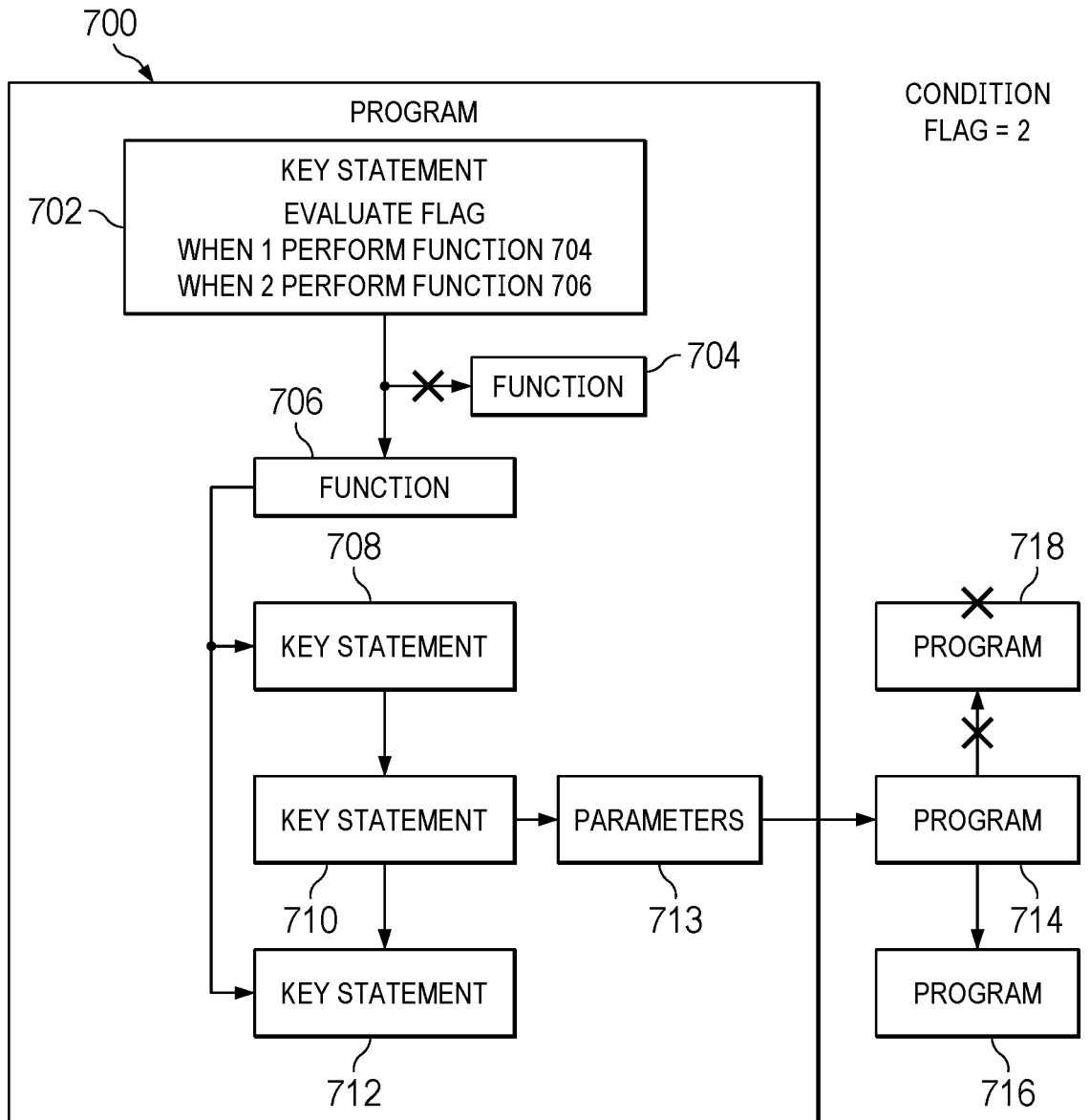
FIG. 7 is a diagram illustrating process flow for executing programs to perform a service in an application in accordance with an illustrative embodiment.

Turning next to FIG. 7, a diagram illustrating process flow for executing programs to perform a service in an application is depicted in accordance with an illustrative embodiment. In FIG. 7, an execution flow is illustrated with a condition that includes a variable "FLAG" that equals to 2. In this illustrative example, program 700 includes key statement 702 that evaluates variable "FLAG" for determining an execution flow for performing the service in the application. Key statement 702 performs function 704 when "FLAG" is 1 and performs function 706 when "FLAG" is 2.

As depicted, key statement 702 performs function 706 because the variable "FLAG" equal to 2. Function 706 calls other key statements such as key statement 708 and key statement 712 in program 700. Key statement 708 invokes the execution of key statement 710 in program 700. Further, key statement 710 calls program 714 and sends parameters 713 to be used by program 714.

In FIG. 7, programs that perform the same service for the application are called for execution. Other programs are not called in this example. As depicted, program 714 calls program 716 because program 700, program 714, and program 716 perform the same service. On the other hand, program 714 does not call program 718 because program 718 performs a different service and does not use parameters 713 during execution.

Turning next to FIG. 8, a flowchart of a process for extracting source code for a service is depicted in accordance with an illustrative embodiment. The process in FIG. 8 can be implemented in hardware, software, or both. When implemented in software, the process can take the form of program instructions that are run by one of more processor units located in one or more hardware devices in one or more computer systems. For example, the process can be implemented in code manager 214 in computer system 212 in FIG. 2.

The process begins by identifying key statements for the service in the source code for a region of interest in an application in response to a program selection selecting a program in the region of interest (step 800). The process determines importance scores for the key statements based on an amount of the source code executed by each of the key statements in the source code in the region of interest (step 802).

The process generates an output that comprises the key statements associated with the importance scores and portions of the source code executed in response to execution of the key statements (step 804). The process adds a number of code blocks derived from a number of the portions of the source code run for a key statement to a workbook in response to receiving a key statement selection of the key statement in the output (step 806). The process terminates thereafter.

Figure 9:
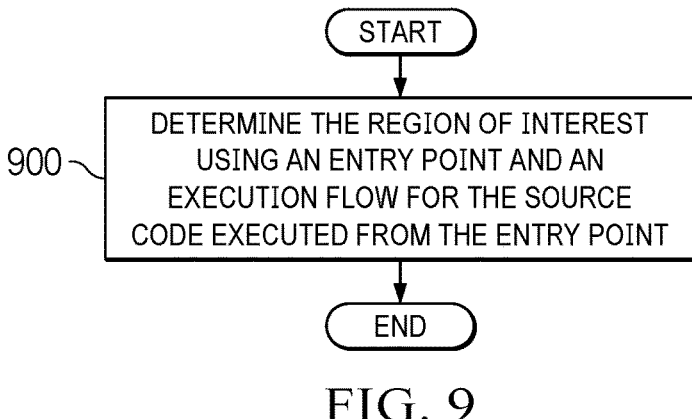
FIG. 9 is a flowchart of a process for determining the region of interest in accordance with an illustrative embodiment.

With reference now to FIG. 9, a flowchart of a process for determining the region of interest is depicted in accordance with an illustrative embodiment. The process illustrated in this figure is an example of an additional step that can be performed with the steps in FIG. 8.

The process determines the region of interest using an entry point and an execution flow for the source code executed from the entry point (step 900). In step 900, the region of interest includes a number of programs that contain the source code for the service. The process terminates thereafter.

Figure 10:
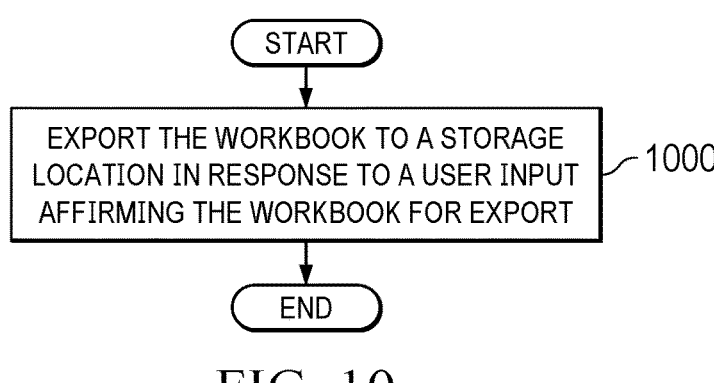
FIG. 10 is a flowchart of a process for exporting a workbook in accordance with an illustrative embodiment.

In FIG. 10, a flowchart of a process for exporting a workbook is depicted in accordance with an illustrative embodiment. The process depicted in this figure is an example of an additional step that can be performed with the steps in FIG. 8.

The process exports the workbook to a storage location in response to a user input affirming the workbook for export (step 1000). The process terminates thereafter.

Figure 11:
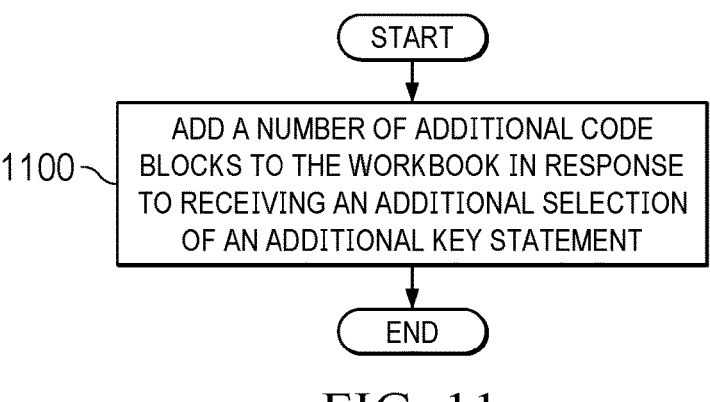
FIG. 11 is a flowchart of a process for adding code blocks to a workbook in accordance with an illustrative embodiment.

With reference next to FIG. 11, a flowchart of a process for adding code blocks to a workbook is depicted in accordance with an illustrative embodiment. The process illustrated in FIG. 11 is an example of additional steps that can be performed in steps in FIG. 8.

The process adds a number of additional code blocks to the workbook in response to receiving an additional selection of an additional key statement (step 1100). In step 1100, the number of additional code blocks added to the workbook is derived from a number of additional portions of the source code run for the additional key statement. The process terminates thereafter.

Figure 12:
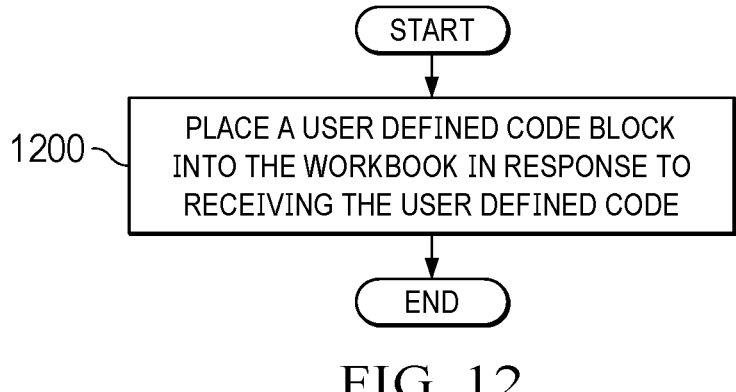
FIG. 12 is a flowchart of process for adding a user-defined code block to a workbook in accordance with an illustrative embodiment.

With reference now to FIG. 12, a flowchart of process for adding a user-defined code block to a workbook is depicted in accordance with an illustrative embodiment. The process depicted in this figure is an example of an additional step that can be performed with the steps in FIG. 8.

The process places a user defined code block into the workbook in response to receiving the user defined code (step 1200). The process terminates thereafter.

Figure 13:
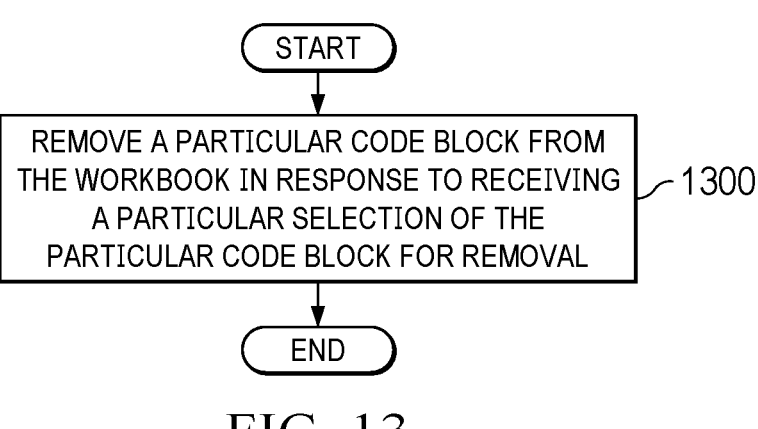
FIG. 13 is a flowchart of process for removing a code block from a workbook in accordance with an illustrative embodiment.

Next in FIG. 13, a flowchart of the process for removing a code block from a workbook is depicted in accordance with an illustrative embodiment. The process depicted in this figure is an example of an additional step that can be performed with the steps in FIG. 8.

The process removes a particular code block from the workbook in response to receiving a particular selection of the particular code block for removal (step 1300). The process terminates thereafter.

With reference to FIG. 14, a flowchart of process for removing program codes from code blocks in a workbook is depicted in accordance with an illustrative embodiment. The process depicted in FIG. 14 is an example of additional steps that can be performed with the steps in FIG. 8.

The process begins by receiving an unneeded condition in code blocks in a workbook (step 1400). The process identifies code in the code blocks that are specific to the unneeded condition (step 1402).

The process removes the code in the code blocks identified as being specific to the condition (step 1404). The process terminates thereafter.

In FIG. 14, the process can be used to remove branches of program code for conditions that are unneeded from code blocks in a workbook. This process can be used for branches of code that can be included because a key statement includes both a wanted condition and an unwanted condition.

For example, when a process extracts code blocks to add to a workbook based on a condition of "credit>100", the process may also extract code blocks that includes other conditions in addition to "credit>100". For example, the process can extract a code block that includes the condition of "credit>100" and a condition of "credit≤100". In this example, the condition of "credit≤100" and program code executed when the condition of "credit≤100" is met are unwanted program code in the code blocks.

In response, the process can select unwanted program code to be removed from the code blocks. In this illustrative example, the process selects the condition of "credit≤100"

and all program code executed when the condition of "credit≤100" in the code blocks for removal. As a result, the branch of code for the condition of "credit≤100" is removed from the code blocks from the workbook.

With reference to FIG. 15, a flowchart of process for selecting program code extraction is depicted in accordance with an illustrative embodiment. The process depicted in FIG. 15 is an example of additional steps that can be performed with the steps in FIG. 8. In this example, the program in the flowchart in FIG. 8 is a first program in the region of interest for the application.

The process selects a second program in the region of interest (step 1500). The process repeats identifying the key statements, determining the importance scores, generating the output, and adding the number of code blocks for the second program (step 1502). The process terminates thereafter.

Turning now to FIG. 16, a flowchart of a process for generating and output is depicted in accordance with an illustrative embodiment. The process in this figure is an example of one implementation for step 804 in FIG. 8.

The process generates a list of the key statements based on the importance scores for the key statements (step 1600). The process associates the portions of the source code with the key statements (step 1602). The process terminates thereafter.

In FIG. 17, a flowchart of a process for displaying a graphical user interface to receive user input in extracting source code from the application is depicted in accordance with an illustrative embodiment. The process in FIG. 17 is an example of additional steps that can be formed with the process in FIG. 16 and FIG. 8.

The process displays the list of the key statements with the importance scores for the key statements in a graphical user interface on a display system (step 1700). The process displays the number of portions of the source code in the portions of the source code in the graphical user interface on the display system in response to a user input selecting the key statement associated with the number of portions of the source code (step 1702). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 18:
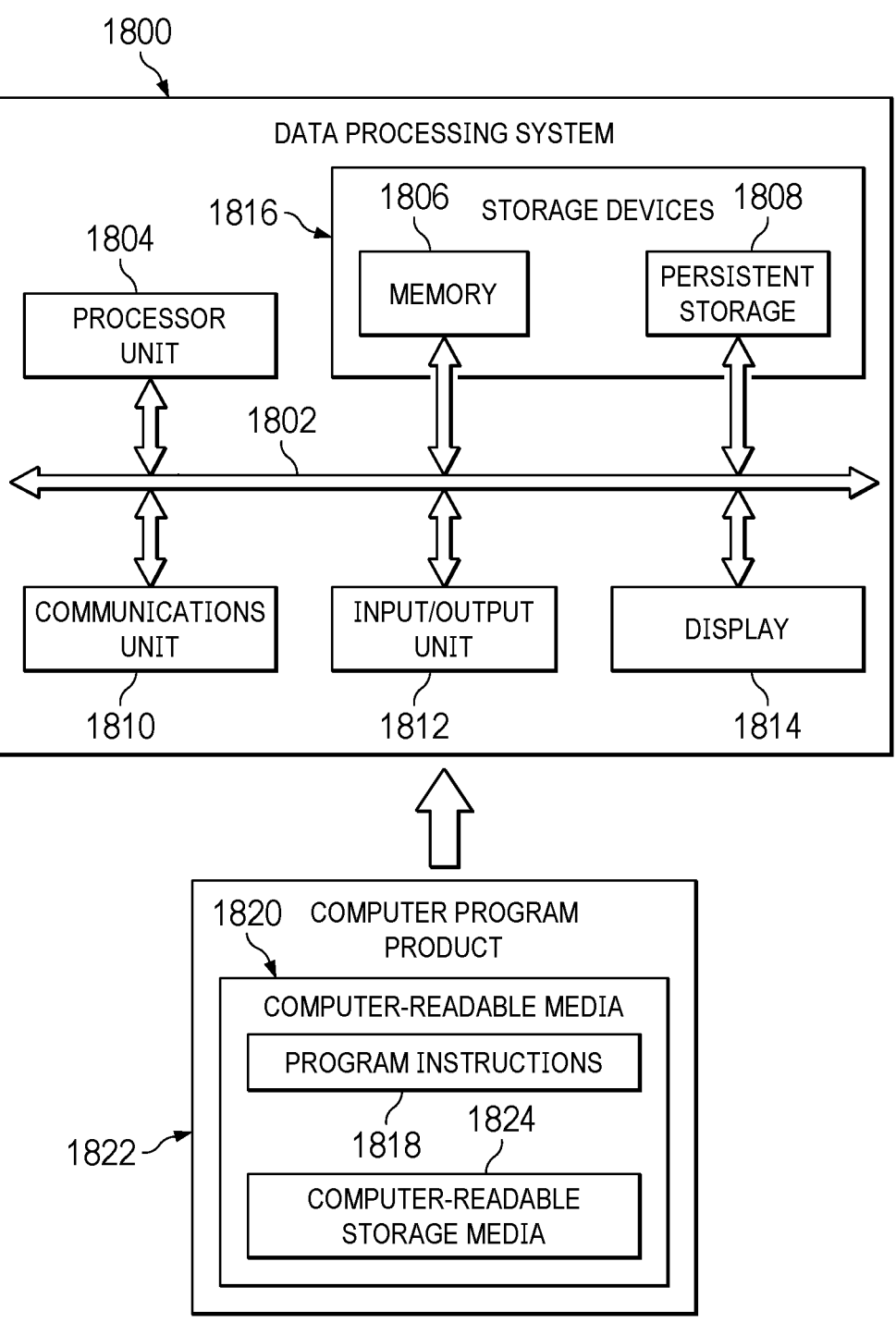
FIG. 18 is a block diagram of a data processing system in accordance with an illustrative embodiment.

Turning now to FIG. 18, a block diagram of a data processing system is depicted in accordance with an illustrative embodiment. Data processing system 1800 can be used to implement computers and computing devices in computing environment 100 in FIG. 1. Data processing system 1800 can also be used to implement computer system 212 in FIG. 2. In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1804 can be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1816 may also be referred to as computer readable storage devices in these illustrative examples. Memory 1806, in these examples, can be, for example, a random-access memory or any other suitable volatile or non-volatile storage device. Persistent storage 1808 may take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs can be located in storage devices 1816, which are in communication with processor unit 1804 through communications framework 1802. The processes of the different embodiments can be performed by processor unit 1804 using computer-implemented instructions, which may be located in a memory, such as memory 1806.

These instructions are referred to as program instructions, computer usable program instructions, or computer readable program instructions that can be read and executed by a processor in processor unit 1804. The program instructions in the different embodiments can be embodied on different physical or computer readable storage media, such as memory 1806 or persistent storage 1808.

Program instructions 1818 are located in a functional form on computer readable media 1820 that is selectively removable and can be loaded onto or transferred to data processing system 1800 for execution by processor unit 1804. Program instructions 1818 and computer readable media 1820 form computer program product 1822 in these illustrative examples. In the illustrative example, computer readable media 1820 is computer readable storage media 1824.

Computer readable storage media 1824 is a physical or tangible storage device used to store program instructions 1818 rather than a medium that propagates or transmits program instructions 1818. Computer readable storage media 1824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1818 can be transferred to data processing system 1800 using a computer readable signal media. The computer readable signal media are signals and can be, for example, a propagated data signal containing program instructions 1818. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1820" can be singular or plural. For example, program instructions 1818 can be located in computer readable media 1820 in the form of a single storage device or system. In another example, program instructions 1818 can be located in computer readable media 1820 that is distributed in multiple data processing systems. In other words, some instructions in program instructions 1818 can be located in one data processing system while other instructions in program instructions 1818 can be located in one data processing system. For example, a portion of program instructions 1818 can be located in computer readable media 1820 in a server computer while another portion of program instructions 1818 can be located in computer readable media 1820 located in a set of client computers.

The different components illustrated for data processing system 1800 are not meant to provide architectural limitations to the manner in which different embodiments can be implemented. In some illustrative examples, one or more of the components may be incorporated in or otherwise form a portion of, another component. For example, memory 1806, or portions thereof, may be incorporated in processor unit 1804 in some illustrative examples. The different illustrative embodiments can be implemented in a data processing system including components in addition to or in place of those illustrated for data processing system 1800. Other components shown in FIG. 18 can be varied from the illustrative examples shown. The different embodiments can be implemented using any hardware device or system capable of running program instructions 1818.

Thus, illustrative embodiments provide a computer implemented method, computer system, and computer program product for extracting code for a service. A number of processor units identify key statements for the service in a source code for a region of interest in an application in response to a program selection selecting a program in the region of interest. The number of processor units determines importance scores for the key statements based on an amount of the source code executed by each of the key statements in the source code in the region of interest. The number of processor units generates an output that comprises the key statements associated with the importance scores and portions of the source code executed in response to execution of the key statements. The number of processor units adds a number of code blocks derived from a number of the portions of the source code run for a key statement to a workbook in response to receiving a key statement selection of the key statement in the output.

One or more illustrative examples provide an ability to isolate or extract source code for a service from an application. This extraction source code can be performed for services that can extend through different programs within the application. In illustrative examples, this extraction source code can be provided with user input to provide a user guide execution path for slicing. As result, the illustrative examples enable isolating code for a service from legacy applications and can identify a branch of code in a particular program.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for extracting source code for a service, the computer implemented method comprising:

constructing, by a number of processor units, a control flow graph for source code in a region of interest in an application;

identifying, by the number of processor units, key statements for the service in the source code for the region of interest in the application, wherein the key statements control flow of execution within the application and wherein the region of interest is determined using an entry point and an execution flow for the source code executed from the entry point, in response to a program selection selecting a program in the region of interest, wherein the key statements control execution flow within the application;

determining, by the number of processor units, importance scores for the key statements based on an amount of the source code executed by each of the key statements in the source code in the region of interest, wherein determining of the importance scores comprises:

determining counts of the control flow statements for each key statement using weighted values where Perform statements and Goto statements have a weight of 1 and Call statements and Link statements together have a weight of 2;

determining a highest count from the counts of the control flow statements;

computing an importance score for each key statement using a weighted sum formula comprising a ratio of the counts of the control flow statements for the key statements to the highest count and a plurality of metrics including depth in the control flow graph;

generating, by the number of processor units, an output that comprises a ranked list of the key statements associated with the importance scores and portions of the source code executed in response to execution of the key statements; and adding, by the number of processor units, a number of code blocks derived from a number of the portions of the source code run for a key statement to a workbook in response to receiving a key statement selection of the key statements in the output, wherein the workbook contains a collection of related code and resources usable to execute the service; and exporting, by the number of processor units, the workbook to a storage location to enable creation of a standalone modular form of the service.

2. The computer implemented method of claim 1, wherein the key statements are statements within the source code that control a flow of execution within the application, and further comprising:

determining, by the number of processor units, the region of interest using an entry point and an execution flow for the source code executed from the entry point, wherein the region of interest includes a number of programs that contain the source code for the service, wherein the service provides a set of software functionalities that extends through the number of programs within the application.

3. The computer implemented method of claim 1 further comprising:

exporting, by the number of processor units, the workbook to a storage location in response to a user input affirming the workbook for export.

4. The computer implemented method of claim 1 further comprising:

adding, by the number of processor units, a number of additional code blocks to the workbook in response to receiving an additional selection of an additional key statement, wherein the number of additional code blocks added to the workbook is derived from a number of additional portions of the source code run for the additional key statement.

5. The computer implemented method of claim 1 further comprising:

placing, by the number of processor units, a user defined code block into the workbook in response to receiving the user defined code.

6. The computer implemented method of claim 1 further comprising:

removing, by the number of processor units, a particular code block from the workbook in response to receiving a particular selection of the particular code block for removal.

7. The computer implemented method of claim 1, wherein the program is a first program in the region of interest for the application and further comprising:

selecting, by the number of processor units, a second program in the region of interest; and repeating, by the number of processor units, identifying the key statements, determining the importance scores, generating the output, and adding the number of code blocks for the second program.

8. The computer implemented method of claim 1, wherein generating the output comprises:

generating, by the number of processor units, a list of the key statements based on the importance scores for the key statements; and associating, by the number of processor units, the portions of the source code with the key statements.

9. The computer implemented method of claim 8 further comprising:

displaying, by the number of processor units, the list of the key statements with the importance scores for the key statements in a graphical user interface on a display system, wherein the list of the key statements are ranked based on the importance scores; and displaying, by the number of processor units, the portions of the source code in the graphical user interface on the display system in response to a user input selecting the key statement associated with the portions of the source code.

10. A computer system comprising:

a number of processor units, wherein the number of processor units executes program instructions to:

construct a control flow graph for source code in a region of interest in an application;

identify key statements for a service in the source code for the region of interest in the application, wherein the key statements control flow of execution within the application and wherein the region of interest is determined using an entry point and an execution flow for the source code executed from the entry point, in response to a program selection selecting a program in the region of interest, wherein the key statements control execution flow within the application;

determine importance scores for the key statements based on an amount of the source code executed by each of the key statements in the source code in the region of interest, wherein determining the importance scores comprises:

determining counts of control flow statements for each key statement using weighted values where Perform statements and Goto statements have a weight of 1 and Call statements and Link statements together have a weight of 2;

determining a highest count from the counts of the control flow statements;

computing an importance score for each key statement using a weighted sum formula comprising a ratio of the counts of the control flow statements for the key statement to the highest count and a plurality of metrics including depth in the control flow graph;

generate an output that comprises a ranked list of the key statements associated with the importance scores and portions of the source code executed in response to execution of the key statements; and add a number of code blocks derived from a number of the portions of the source code run for a key statement to a workbook in response to receiving a key statement selection of the key statements in the output, wherein the workbook contains a collection of related code and resources usable to execute the service; and exporting, by the number of processor units, the workbook to a storage location to enable creation of a standalone modular form of the service.

11. The computer system of claim 10, wherein the key statements are statements within the source code that control a flow of execution within the application, and wherein the number of processor units further executes the program instructions to:

determine the region of interest using an entry point and an execution flow for the source code executed from the entry point, wherein the region of interest includes a number of programs that contain the source code for the service, wherein the service provides a set of software functionalities that extends through the number of programs within the application.

12. The computer system of claim 10, wherein the number of processor units further executes the program instructions to:

export the workbook to a storage location in response to a user input affirming the workbook for export.

13. The computer system of claim 10, wherein the number of processor units further executes the program instructions to:

add a number of additional code blocks to the workbook in response to receiving an additional selection of additional key statement, wherein the number of additional code blocks added to the workbook is derived from a number of additional portions of the source code run for the additional key statement.

14. The computer system of claim 10, wherein the number of processor units further executes the program instructions to:

place a user defined code block into the workbook in response to receiving the user defined code.

15. The computer system of claim 10, wherein the number of processor units further executes the program instructions to:

remove a particular code block from the workbook in response to receiving a particular selection of the particular code block for removal.

16. The computer system of claim 10, wherein the program is a first program in the region of interest for the application and wherein the number of processor units further executes the program instructions to:

select a second program in the region of interest; and repeat identifying the key statements, determining the importance scores, generating the output, and adding the number of code blocks for the second program.

17. The computer system of claim 10, wherein in generating the output, the number of processor units further executes the program instructions to:

generate a list of the key statements based on the importance scores for the key statements; and associate the portions of the source code with the key statements.

18. The computer system of claim 17, wherein the number of processor units further executes the program instructions to:

display the list of the key statements with the importance scores for the key statements in a graphical user interface on a display system, wherein the list of the key statements are ranked based on the importance scores; and display the portions of the source code in the graphical user interface on the display system in response to a user input selecting the key statement associated with the portions of the source code.

19. A computer program product for extracting source code for a service, the computer program product comprising a computer readable storage medium having program instructions embodied therewith, the program instructions executable by a computer system to cause the computer system to:

construct a control flow graph for source code in a region of interest in an application;

identify key statements for the service in the source code for the region of interest in the application, wherein the key statements control flow of execution within the application and wherein the region of interest is determined using an entry point and an execution flow for the source code executed from the entry point, in response to a program selection selecting a program in the region of interest, wherein the key statements control execution flow within the application;

determine importance scores for the key statements based on an amount of the source code executed by each of the key statements in the source code in the region of interest, wherein determining the importance scores comprises:

determining counts of control flow statements for each key statement using weighted values where Perform statements and Goto statements have a weight of 1 and Call statements and Link statements together have a weight of 2;

determining a highest count from the counts of the control flow statements;

computing an importance score for each key statement using a weighted sum formula comprising a ratio of the counts of the control flow statements for the key statement to the highest count and a plurality of metrics including depth in the control flow graph;

generate an output that comprises a ranked list of the key statements associated with the importance scores and portions of the source code executed in response to execution of the key statements; and add a number of code blocks derived from a number of the portions of the source code run for a key statement to a workbook in response to receiving a key statement selection of the key statements in the output, wherein the workbook contains a collection of related code and resources usable to execute the service; and export the workbook to a storage location to enable creation of a standalone modular form of the service.

20. The computer program product of claim 19, wherein the service provides a set of software functionalities that extends through the number of programs within the application, and wherein the program instructions are further executable by the computer system to cause the computer system to:

export the workbook to a storage location in response to a user input affirming the workbook for export.

\*     \*     \*     \*     \*